United States Patent
Uhm et al.

(10) Patent No.: US 10,276,842 B2
(45) Date of Patent: Apr. 30, 2019

(54) BATTERY MODULE HAVING MOVABLE PRESSURIZATION MEMBER

(71) Applicant: LG CHEM, LTD., Seoul (KR)

(72) Inventors: In Sung Uhm, Daejeon (KR); Je Young Kim, Daejeon (KR); Seunghyun Chung, Daejeon (KR)

(73) Assignee: LG Chem, Ltd. (KR)

( * ) Notice: Subject to any disclaimer, the term of this patent is extended or adjusted under 35 U.S.C. 154(b) by 542 days.

(21) Appl. No.: 14/782,175

(22) PCT Filed: Jul. 15, 2014

(86) PCT No.: PCT/KR2014/006355
§ 371 (c)(1),
(2) Date: Oct. 2, 2015

(87) PCT Pub. No.: WO2015/012520
PCT Pub. Date: Jan. 29, 2015

(65) Prior Publication Data
US 2016/0133892 A1    May 12, 2016

(30) Foreign Application Priority Data
Jul. 25, 2013   (KR) .................. 10-2013-0087899

(51) Int. Cl.
*H01M 2/10* (2006.01)
*H01M 10/0525* (2010.01)
*H01M 10/04* (2006.01)
*H01M 2/02* (2006.01)

(52) U.S. Cl.
CPC ....... *H01M 2/1022* (2013.01); *H01M 2/1061* (2013.01); *H01M 2/1077* (2013.01); *H01M 10/0481* (2013.01); *H01M 10/0525* (2013.01); *H01M 2/0275* (2013.01); *H01M 2220/30* (2013.01)

(58) Field of Classification Search
CPC ......... H01M 10/0481; H01M 10/0525; H01M 2220/30; H01M 2/0275; H01M 2/1022; H01M 2/1061; H01M 2/1077
See application file for complete search history.

(56) References Cited

U.S. PATENT DOCUMENTS

| | | |
|---|---|---|
| 2011/0151312 A1 | 6/2011 | Kim |
| 2011/0262797 A1 | 10/2011 | Kim |
| 2012/0115004 A1 | 5/2012 | Park et al. |
| 2014/0356676 A1 | 12/2014 | Yasooka |

FOREIGN PATENT DOCUMENTS

| | | |
|---|---|---|
| CN | 102110799 A | 6/2011 |
| CN | 102237546 A | 11/2011 |
| JP | 2001236937 A | 8/2001 |
| JP | 2001256941 A | 9/2001 |

(Continued)

OTHER PUBLICATIONS

International Search Report for Application No. PCT/KR2014/006355 dated Oct. 22, 2014.

*Primary Examiner* — Barbara L Gilliam
*Assistant Examiner* — Adam A Arciero
(74) *Attorney, Agent, or Firm* — Lerner, David, Littenberg, Krumholz & Mentlik, LLP

(57) ABSTRACT

Disclosed herein is a battery module including a module case, a battery cell stack mounted in the module case, and a movable pressurization member for pressurizing the battery cell stack.

12 Claims, 1 Drawing Sheet

(56) References Cited

FOREIGN PATENT DOCUMENTS

| | | | |
|---|---|---|---|
| JP | 2009238606 A | 10/2009 | |
| JP | 2013165039 A | 8/2013 | |
| JP | 2014175078 A | 9/2014 | |
| KR | 20070048893 A | 5/2007 | |
| KR | 20110072910 A | 6/2011 | |
| KR | 20110117586 A | 10/2011 | |
| KR | 20110117596 A | 10/2011 | |
| KR | 20120048280 A | 5/2012 | |

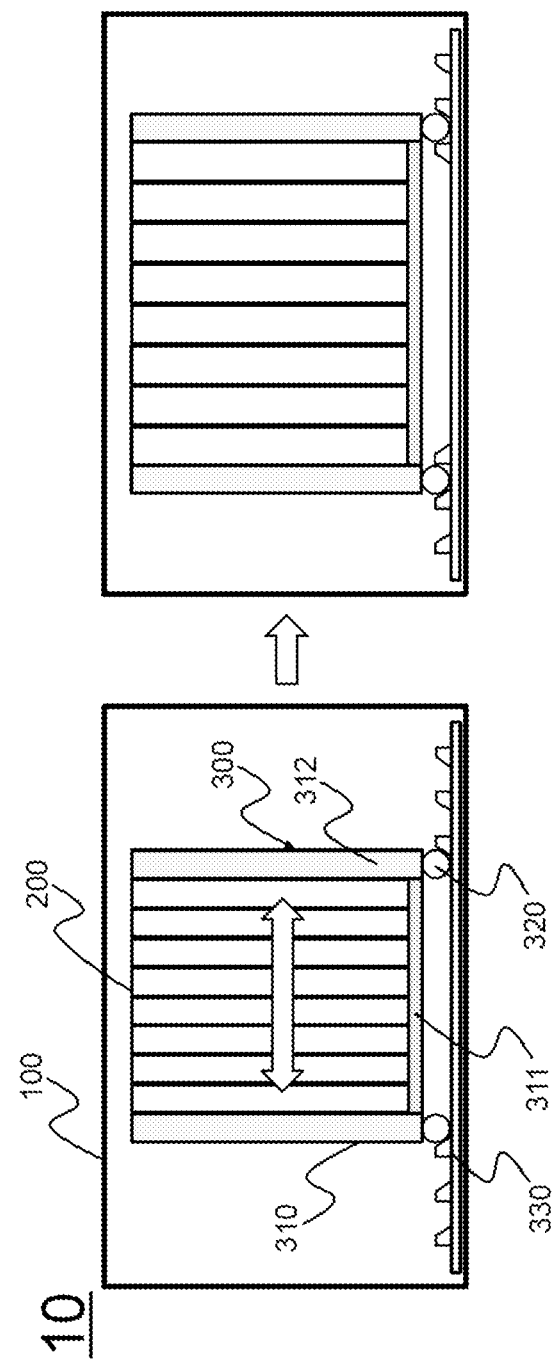

BATTERY MODULE HAVING MOVABLE PRESSURIZATION MEMBER

CROSS-REFERENCE TO RELATED APPLICATIONS

The present application is a national phase entry under 35 U.S.C. § 371 of International Application No. PCT/KR2014/006355, filed Jul. 15, 2014, which claims priority to Korean Patent Application No. 10-2013-0087899 filed on Jul. 25, 2013, the disclosures of which are incorporated herein by reference.

TECHNICAL FIELD

The present invention relates to a battery module including a movable pressurization member.

BACKGROUND ART

As mobile devices have been increasingly developed, and the demand for such mobile devices has increased, the demand for secondary batteries has also sharply increased as an energy source for the mobile devices. Among such secondary batteries is a lithium secondary battery having a high energy density and discharge voltage, into which much research has been carried out and which is now commercialized and widely used.

In general, a secondary battery is configured to have a structure in which an electrode assembly including a positive electrode and a negative electrode stacked or wound in a state in which a separator is disposed between the positive electrode and the negative electrode is mounted in a battery case made of a metal can or a laminate sheet, and an electrolyte is injected into the battery case or the electrode assembly is impregnated with the electrolyte.

However, the secondary battery may have problems in that if the pressure of the battery is not uniformly maintained during the use of the battery, a large amount of gas generated in the battery increases the thickness of the battery, and the electrolyte may leak through sealed portion of the battery case.

Therefore, there is a high necessity for a novel lithium secondary battery that is capable of solving the above problems.

DISCLOSURE

Technical Problem

The present invention has been made to solve the above problems and other technical problems that have yet to be resolved.

It is an object of the present invention to provide a battery module that is capable of uniformly maintaining the pressure of battery cells and preventing leakage of an electrolyte.

Technical Solution

In accordance with one aspect of the present invention, the above and other objects can be accomplished by the provision of a battery module including a module case, a battery cell stack mounted in the module case, and a movable pressurization member for pressurizing the battery cell stack.

The battery module according to the present invention includes the movable pressurization member for pressurizing the battery cell stack. Consequently, it is possible to uniformly maintain the pressure of battery cells constituting the battery cell stack and to prevent leakage of an electrolyte.

The movable pressurization member may be disposed between the module case and the battery cell stack.

The movable pressurization member may include a support member including a separable base plate and leg members coupled to opposite ends of the separable base plate, sliding movement members for moving the support member in directions opposite to directions in which the battery cell stack are pressurized, and a stopper member for stopping movement of the sliding movement members by stages. The separable base plate may be configured to have a structure in which when the distance between the leg members coupled to opposite ends of the separable base plate is increased due to swelling of the battery cell stack, the size of the separable base plate 311 is increased in a direction in which the battery cells are stacked in proportion to the increased distance between the leg members in the direction in which the battery cells are stacked.

In an embodiment, each of the sliding movement members may be a sliding rail including a fixed first rail and a movable second rail movable on the first rail, and the stopper member may be configured to have a concave-convex structure corresponding to the first rail and the second rail.

In another embodiment, each of the sliding movement members may be a sliding rail including a fixed first rail and a movable second rail movable on the first rail, and the stopper member may include an elastic protrusion formed at the first rail and fastening grooves formed at the second rail at regular intervals such that the elastic protrusion is coupled into a corresponding one of the fastening grooves.

In another embodiment, the stopper member may be configured to have a concave-convex structure, the stopper member being mounted in the module case, and each of the sliding movement members may be a wheel member coupled to a lower end of a corresponding one of the leg members, the wheel member being moveable on the stopper member having the concave-convex structure.

In a further embodiment, each of the sliding movement members may be a wheel member coupled to a lower end of a corresponding one of the leg members, and the stopper member may be a compression elastic member connected between the leg members coupled to the opposite ends of the separable base plate.

Specifically, the compression elastic member may be a compression spring.

The movable pressurization member may release expansion stress of battery cells constituting the battery cell stack for uniformly maintaining pressure applied to the respective battery cells.

The pressure may be maintained within a range of 30 kgf to 80 kgf. If the pressure is lower than 30 kgf, it is not possible to sufficiently restrain swelling of the battery cells. On the other hand, if the pressure is higher than 80 kgf, the battery cells may be damaged due to such excessive pressure. For this reason, the movable pressurization member may maintain pressure applied to the battery cells within the above-defined range.

The battery cell stack may include a plurality of battery cells, and each of the battery cells may be a pouch-shaped battery cell configured to have a structure in which an electrode laminate is mounted in a battery case together with an electrolyte in a sealed state.

In accordance with another aspect of the present invention, there is provided a battery pack including the battery module with the above-stated construction as a unit module.

In accordance with a further aspect of the present invention, there is provided a device including the battery pack as a power source. Specifically, the device may be any one selected from a group consisting of a mobile phone, a portable computer, a smart phone, a smart pad, a netbook computer, a light electronic vehicle (LEV), an electric vehicle, a hybrid electric vehicle, a plug-in hybrid electric vehicle, and a power storage device.

The structure and manufacturing method of the device are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a typical view showing a battery module according to an embodiment of the present invention.

BEST MODE

Now, exemplary embodiments of the present invention will be described in detail with reference to the accompanying drawings. It should be noted, however, that the scope of the present invention is not limited by the illustrated embodiments.

FIG. 1 is a typical view showing a battery module according to an embodiment of the present invention.

Referring to FIG. 1, a battery module 10 includes a module case 100, a battery cell stack 200, and a movable pressurization member 300.

The movable pressurization member 300 includes a support member 310, sliding movement members 320, and a stopper member 330.

The support member 310 includes a separable base plate 311 and leg members 312.

Each of the sliding movement members 320 is coupled to the lower end of a corresponding one of the leg members 312. Each of the sliding movement members 320 is configured to have a wheel structure. Consequently, the sliding movement members 320 may be moved on the stopper member 330.

The stopper member 330 is configured to have a concave-convex structure. Consequently, the stopper member 330 may stop the movement of the sliding movement members 320 by stages.

When the battery cell stack 200 swells due to gas generated from the battery cell stack 200, pressure is applied from the battery cell stack 200 to the leg members 312. As a result, the sliding movement members 320 connected to the respective leg members 312 are moved away from each other in right and left directions on the stopper member 330. In addition, the separable base plate 311 is configured to have a structure in which the size of the separable base plate 311 is increased as the distance between the leg members 312 is increased due to swelling of the battery cell stack 200. In this structure, the pressure applied to the battery cell stack 200 is uniformly maintained.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery module according to the present invention includes a movable pressurization member that is capable of pressurizing a battery cell stack, thereby uniformly maintaining the pressure of battery cells and preventing leakage of an electrolyte.

The invention claimed is:

1. A battery module comprising:
 a module case;
 a battery cell stack mounted in the module case; and
 a movable pressurization member for pressurizing the battery cell stack, wherein the movable pressurization member comprises a support member comprising a separable base plate and leg members coupled to opposite ends of the separable base plate, sliding movement members for moving the support member in directions opposite to directions in which the battery cell stack are pressurized, and a stopper member for stopping movement of the sliding movement members by stages.

2. The battery module according to claim 1, wherein the movable pressurization member is disposed between the module case and the battery cell stack.

3. The battery module according to claim 1, wherein each of the sliding movement members is a sliding rail comprising a fixed first rail and a movable second rail movable on the first rail, and wherein the stopper member is configured to have a concave-convex structure corresponding to the first rail and the second rail.

4. The battery module according to claim 1, wherein each of the sliding movement members is a sliding rail comprising a fixed first rail and a movable second rail movable on the first rail, and wherein the stopper member comprises an elastic protrusion formed at the first rail and fastening grooves formed at the second rail at regular intervals such that the elastic protrusion is coupled into a corresponding one of the fastening grooves.

5. The battery module according to claim 1, wherein the stopper member is configured to have a concave-convex structure, the stopper member being mounted in the module case, and wherein each of the sliding movement members is a wheel member coupled to a lower end of a corresponding one of the leg members, the wheel member being moveable on the stopper member having the concave-convex structure.

6. The battery module according to claim 1, wherein each of the sliding movement members is a wheel member coupled to a lower end of a corresponding one of the leg members, and wherein the stopper member is a compression elastic member connected between the leg members coupled to the opposite ends of the separable base plate.

7. The battery module according to claim 6, wherein the compression elastic member is a compression spring.

8. The battery module according to claim 1, wherein the movable pressurization member releases expansion stress of battery cells constituting the battery cell stack for uniformly maintaining pressure applied to the respective battery cells.

9. The battery module according to claim 8, wherein the pressure is maintained within a range of 30 kgf to 80 kgf.

10. The battery module according to claim 1, wherein the battery cell stack comprises a plurality of battery cells, each of which is a pouch-shaped battery cell configured to have a structure in which an electrode laminate is mounted in a battery case together with an electrolyte in a sealed state.

11. A battery pack comprising a battery module according to claim 1.

12. A device using a battery pack according to claim 11 as a power source.

* * * * *